United States Patent [19]
Elliott et al.

[11] Patent Number: 5,992,003
[45] Date of Patent: Nov. 30, 1999

[54] METHOD FOR SPACING LAMINATIONS

[75] Inventors: E. Wesley Elliott, County of Westmoreland; Paul V. Klabnik, County of Allegheny, both of Pa.

[73] Assignee: Oberg Industries, Inc., Freeport, Pa.

[21] Appl. No.: 08/969,995

[22] Filed: Nov. 13, 1997

[51] Int. Cl.$^6$ .................................................. H02K 15/02
[52] U.S. Cl. ............................... 29/596; 29/609; 310/42; 310/216
[58] Field of Search ............................ 29/596, 598, 609, 29/525; 310/42, 216–218

[56] References Cited

U.S. PATENT DOCUMENTS 3,202,851  8/1965  Zimmerle et al. .
4,538,345  9/1985  Diedrichs .
4,619,028  10/1986  Neuenschwander .
5,349,741  9/1994  Neuenschwander .

*Primary Examiner*—Carl E. Hall
*Attorney, Agent, or Firm*—Buchanan Ingersoll, P.C.

[57] ABSTRACT

A method for manufacturing laminated parts in which spacing of individual laminas is maintained during the manufacturing process. As the laminas are stamped from strip stock material, a staking lug is formed in each lamina. The staking lug comprises an attaching lug, having a corresponding attaching cavity on an opposite surface, and a separation lug. The mating attaching lugs and cavities keep the spaced stack in a single unit configuration while the separation lug ensures adequate spacing between individual laminas for annealing and/or insulation of the individual laminas. The staking lug is preferably formed in one stamping step in a punch press machine, and eliminates the need for rotation of the laminas or alternate stamping methodologies, simplifying the laminated part manufacturing process.

37 Claims, 3 Drawing Sheets

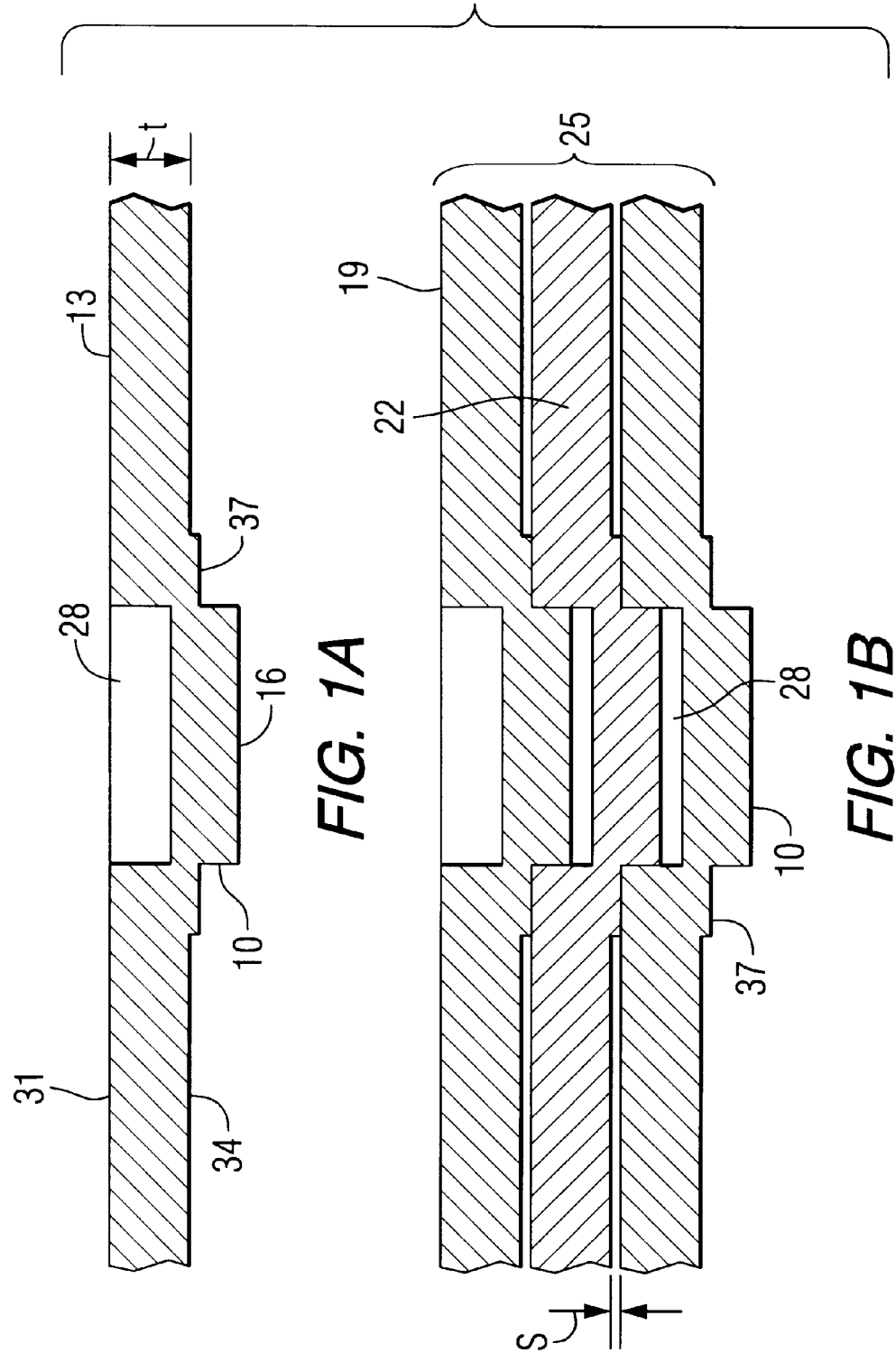

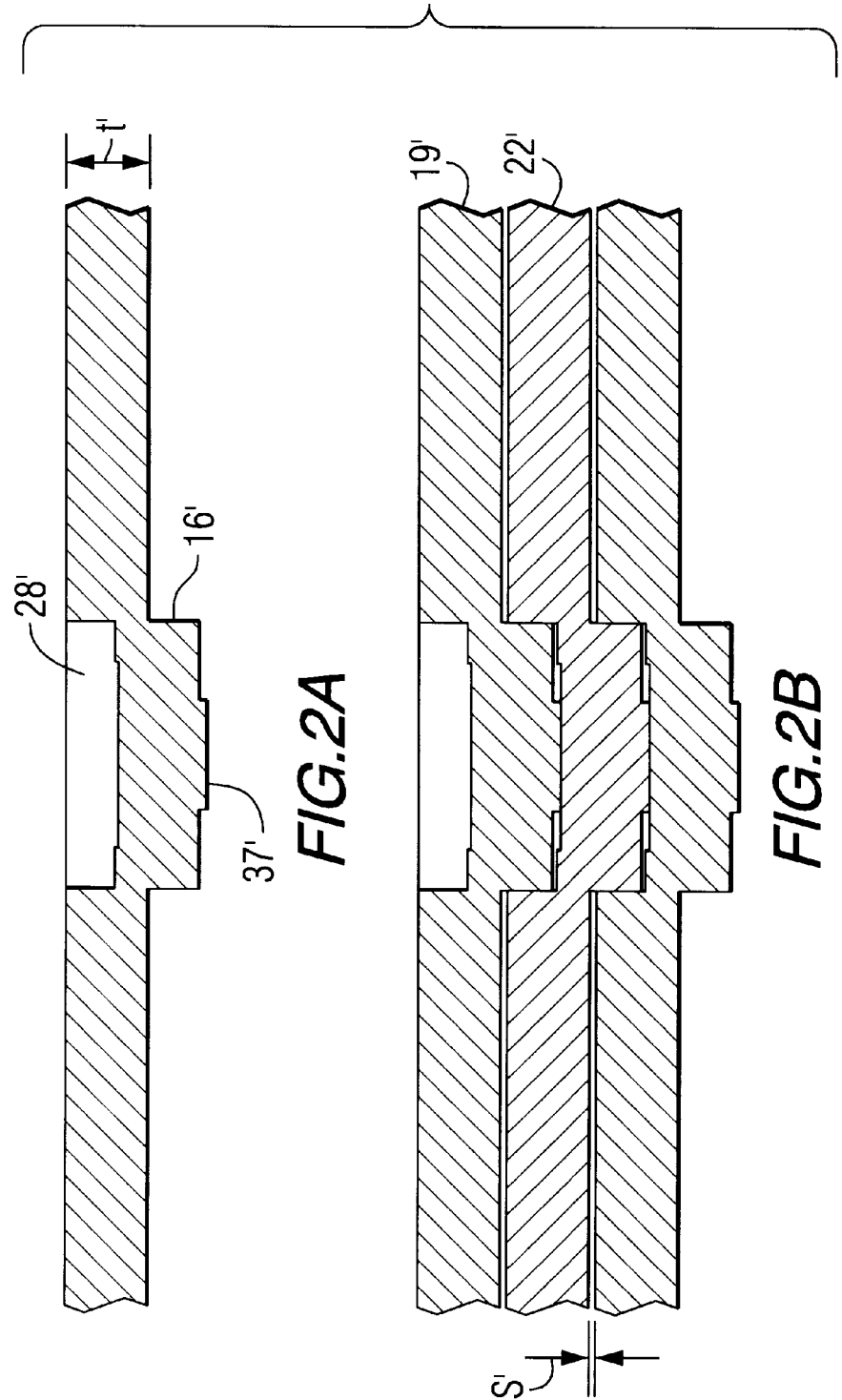

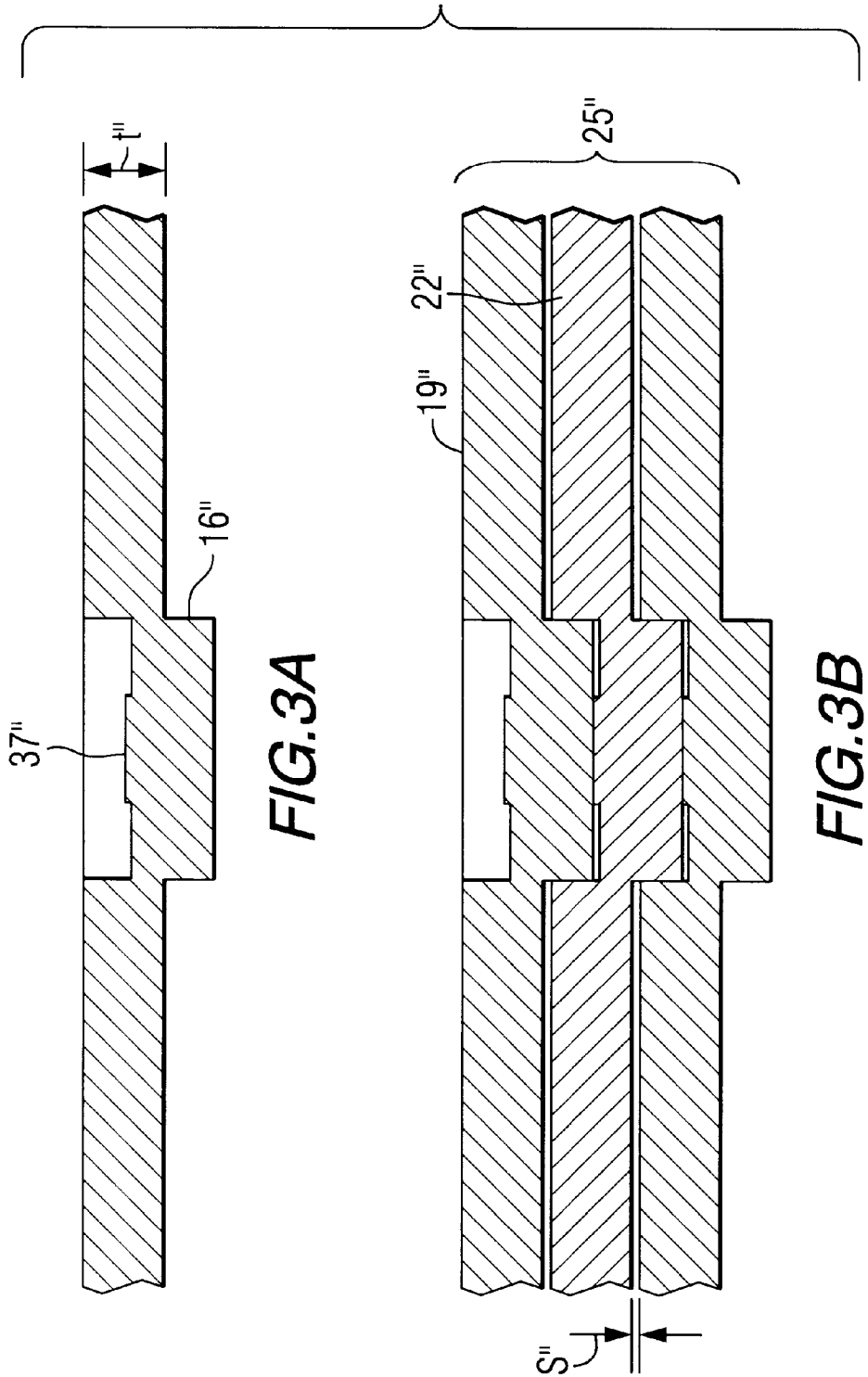

METHOD FOR SPACING LAMINATIONS

BACKGROUND OF THE INVENTION

1. Field of the Invention

The present invention relates generally to the manufacturing of laminated parts from a stack of laminations, and more particularly to a method for forming and stacking individual laminations.

2. Description of the Prior Art

It is well known that certain structures may be formed by the stacking of a series of laminations or laminas. For example, elements of electric motors, solenoids and transformers, such as rotors and stators, may be formed by this process. Typically, the laminas are blanked from continuous strip stock and then stacked and bound together to form the part being manufactured. Another step in the manufacturing process may involve annealing the lamination stack so as to both remove internal stresses within the individual laminas as well as provide an insulating layer on each of the laminations. The stacks are then pressed together into a solid unit so as to form the final machine element.

At least two important considerations in stacking the individual laminations are maintaining the laminas within the stack prior to the final pressing operation, and providing adequate spacing between the laminas while the stack is being annealed and/or insulated. One method for stacking laminations is disclosed in U.S. Pat. No. 4,538,345 issued to Diederichs on Sep. 3, 1985. The method disclosed therein involves the stamping of projections or depressions into the individual laminas and assembling the unit by means of the interlocking projections and depressions prior to the annealing and pressing steps. A minimum axial separation is provided between the individual laminations for the annealing process, and the final stack is assembled in a final pressing operation such that the tabs used to maintain the separation are bent back into their original shape. The separation distance between the individual laminations is achieved by placing tabs in alternate areas on the individual laminations as they are punched or stamped. The alternating displacement in the successive pairs of the laminas in the stack ensure that the tabs in an above lamination come in contact only with a flat part of the next lamina, which has not been bent out.

A second method of ensuring adequate separation between the individual laminations is disclosed in U.S. Pat. No. 5,349,741 to Neuenschwander which issued on Sep. 27, 1994. In this process for forming the plurality of blank laminas, a blanking machine forms dimples in the laminas prior to their stacking, the dimples being located in offset positions relative to adjacent laminations to cause the laminas of the stack to be spaced apart. After the annealing step, the lamina stack is then compressed to bring the laminas into abutting relation to be subsequently manufactured into the rotor or stator cores. The dimples are offset from each other in successive laminas so that the dimples of a succeeding lamina do not fall within a corresponding depression created in the preceding lamina. One method of offsetting the dimples is to arcuately displace every other lamina by rotation of each successive lamina 180° after the dimples have been formed so as to provide the desired offset. An alternative method disclosed of offsetting the dimples is to provide two sets of dimple forming dies alternately actuated by a cam mechanism or the like, resulting in alternately displaced dimples. A separate step forms interlocking portions on the lamina to hold the stack together.

In either case, in order to provide the alternate stamping or rotation, typical prior art methods require relatively complicated machine controllers to ensure that the dimples are offset from each other during the stacking process. Moreover, two separate stamping operations forming two sets of projections may be required: one for providing the offset dimples or tabs, and a second stamping operation to provide interlocking means between individual laminas to ensure that the spaced stack remains assembled during the manufacturing process.

What is needed then is a simplified method for providing an offset between successive laminas in a lamination stack for a machine part so as to ensure adequate separation for a proper annealing process, as well as maintaining the spaced stack in a generally assembled manner during the manufacturing process.

It is therefore an object of the present invention to provide a method of stamping and forming individual laminas to be assembled into a lamination stack such that a minimum separation distance is maintained between the individual laminas.

It is still a further object of the present invention to provide a means and method for joining the individual laminas together during the manufacturing process so as to assemble a spaced pack arrangement.

It is a yet another object of the present invention to simplify the steps necessary in stamping the individual laminas during the stack formation process.

It is a still further object of the present invention to provide a separation offset between the individual laminas, which offset is recompressed and removed during the final pressing operation in providing the final stack formation of the desired height and having the desired mechanical and electrical properties.

SUMMARY OF THE INVENTION

The above objects are attained by the present invention according to which, briefly stated, a method of manufacturing laminated parts from a plurality of laminas, wherein the laminas for forming the laminated part are blanked from strip stock material and then stacked to form the laminated part, comprises the steps of providing a first lamination having opposed surfaces, and forming a first staking lug on a first surface of the first lamination, the first staking lug comprising a first attaching lug and a first separation lug wherein a first attaching cavity is formed on an opposite surface of the first lamination. A second lamination having opposed surfaces is also provided, a second staking lug being formed therein on one of the opposed surfaces of the second lamination, the second staking lug also comprising a second attaching lug and a second separation lug, wherein the second attaching cavity is formed on an opposite surface of the second lamination. The first and second laminations are stacked, such that the second staking lug is generally received in the first attaching cavity whereby one of said first and second separation lugs provides a space between the first and second laminations.

In one embodiment, the separation lug is formed on the same surface as the attaching lug and projects from the lamination such that the second separation lug on the second lamination contacts the first lamination below it to maintain the separation space. Alternatively, the separation lug is formed on an upper surface of the staking lug and projects upward into the attaching cavity such that the first separation lug of a preceding lamination contacts the bottom surface of a succeeding lamination so as to provide the separation space.

In an alternate embodiment, the method of manufacturing laminated parts from a plurality of laminas wherein the laminas are formed and blanked from strip stock material and then stacked to form the laminated part comprises the steps of forming a staking lug on each of the laminas, the staking lugs comprising an attaching lug on one surface and a corresponding attaching cavity on an opposite surface of each lamina. A separation lug is formed with the attaching lug so as to project therefrom. The individual laminas are assembled into a laminated part with a space therebetween by inserting an attaching lug of a succeeding lamina into an attaching cavity of a preceding lamina as the laminas are stacked, wherein the separation lug of one of said laminas provides the space between the individual laminas.

In one method, the separation lug is formed by means of an annular area which surrounds the attaching lug on the bottom of the lamina. In another embodiment, the separation lug comprises a projection on either the upper or lower surface of the attaching lug such that it contacts the surface of an adjacent succeeding lamina.

BRIEF DESCRIPTION OF THE DRAWINGS

Various other objects, features and advantages of the invention will become more apparent by reading the following detailed description in conjunction with the drawings, which are shown by way of example only, wherein:

FIG. 1, consisting of FIGS. 1A and 1B, shows an individual lamina and partial lamination stack wherein an annular projection is formed on the bottom of each lamina to provide the separation space between individual laminas;

FIG. 2, consisting of FIGS. 2A and 2B, shows an individual lamina and partial lamination stack wherein a separation lug is formed on the bottom of an attaching lug; and FIG. 3, consisting of FIGS. 3A and 3B, shows an individual lamina and partial lamination stack wherein a cylindrical separation lug is formed on an upper surface of the attaching lug and projects into the attaching cavity.

DETAILED DESCRIPTION OF THE PREFERRED EMBODIMENTS

The preferred embodiments disclosed herein relate to a method of manufacturing laminated parts from a plurality of laminas. The laminas for forming the laminated parts are blanked from strip stock material and are then stacked to form the laminated part. While the individual laminas are stamped from the flat sheet or strip steel using commonly known technology, wherein a succeeding lamination is stacked on top of a preceding lamination after they are formed in the die and placed in the stack as they are cut from the strip, the individual laminas are formed in a unique manner resulting in a simplified method for manufacturing laminated parts.

As generally shown in the various figures, laminas are formed with a staking lug, which is a partially cut area in the individual lamina that projects past the bottom surface of the lamination. The staking lugs can be of various forms such as an incomplete piercing, which is where the perimeter of the punch matches the diameter of the lug but the punch has not penetrated completely through the material. The staking lugs also may be a shaped tang that is completely cut around the majority of its perimeter except for an uncut attachment to the lamination. Generally, these methods use commonly known punch presses wherein a die in the bottom of the press receives the staking lug in an opening formed therein and a punch contacts the upper surface of the lamination to form the staking lug in the strip of steel.

Referring now in particular to FIG. 1, in the present invention the staking lug 10 is formed in the individual lamina 13 and includes an attaching lug 16 which is that portion of the staking lug that mechanically attaches a succeeding lamination 19 to a preceding lamination 22 already formed and placed in a stack 25. A corresponding attaching cavity 28 is formed on an upper surface 31 of the lamina. This cavity is formed by displacing metal from the lamina 13 to form the staking lug 10 on the bottom surface 34. It is also to be readily understood that the punch can be on the bottom surface and the die on the top such that the respective top and bottom orientation of the attaching lug 16 and attaching cavity 18 are reversed.

In accordance with the present invention, a separation lug 37 is also formed on the lamina 13, and preferably concurrently with the attaching lug 16. The separation lug is that portion of the staking lug 10 that provides a space (S) between the preceding and succeeding laminations by preventing the attaching lug 16 of the succeeding lamination 19 from fully entering the attaching cavity 28 in the preceding lamination 22. In the embodiment shown in FIG. 1, an annular separation lug 37 is provided on the bottom surface 34 of each lamination.

In order to stamp individual laminas having an annular ring separation lug 37, at the point in the die where the staking lugs 10 are formed, certain of the die components that actually displace and form the metal are uniquely formed. The upper tool, or punch, is generally the same as a conventional stamping tool, and is either cylindrical or noncylindrical in cross section with a substantially flat face perpendicular to the vertical axis of the punch. However, the lower tool, or die element, is altered from those conventionally used in that it is provided with a shallow cavity essentially matching the cross section of the punch with the bottom surface parallel to the face of the die, with no provision for removal of cut metal (commonly referred to as slugs). In addition, there is an annular area around the periphery of the die element cavity that forms the attaching lug 16, the annular area generally corresponding in depth to the spacing desired between the laminations. For a circular staking lug, the annular area may be circular and have a diameter which may be on the order of 50 percent greater than the diameter of a round die cavity, for example. For a non-round die cavity, an annular area that is a constant distance from the cavity perimeter may be provided in the die; or the annular ring may be round without regard to the shape of the cavity in the die element itself. In the embodiment shown in FIG. 1, the annular ring separation lug is formed so as to provide a separation distance or space (S) between laminas 19, 22 on the order of 0.003 inches.

Preferably the depth of penetration of the upper punch into the material will be approximately 75 percent of the strip stock material or lamina thickness (t). However, this is only a preferred depth and can be varied dependent on desired characteristics of the finished stack. However, the depth of the cavity in the die element should be such that the volume of the die cavity (or attaching lug 16) and the volume of the annular ring (or separation lug 37), when added together, substantially equal the volume of the metal displaced by the punch (or the volume of the attaching cavity 28).

In an alternative method, the die cavity opening or diameter may be slightly greater than the cross-sectional dimension or diameter of the punch thereby providing an interference fit between the protruding attaching lug 16 in a succeeding lamination 19 and the attaching cavity 28 created in the preceding lamination 22. In this way, the attaching cavity is formed to have a smaller diameter than the attaching lug, the succeeding lamination thus having an attaching lug of slightly greater dimensions or diameter than the attaching cavity of the preceding lamination. The interference fit allows the stack 25 to be loosely configured as each succeeding lamination is placed on top and the attaching lug is inserted into the attaching cavity.

With the annular area around the perimeter of the die element, the metal flowing into the annular ring creates a small, concentric protrusion to form the separating lug that controls the depth of penetration of the attaching lug into the preceding lamination. As shown in FIG. 1B, by way of example only, for an individual lamina having a thickness (t) of 0.030 inches, the separation lug is formed so as to project from the bottom surface 34 of the lamina 13 by 0.003 inches. When the succeeding lamination is placed on top of a preceding lamination as shown therein, the attaching lug 16 is inserted into the corresponding attaching cavity 28 and the annular ring separation lug 37 on the bottom surface 34 of the surrounding lamina 19 contacts the upper surface 31 of the preceding lamina 22 to provide the necessary stand-off between laminas so as to provide a spaced stack 25 during the manufacturing process having the necessary space (S) between individual laminas for the annealing step in the stack construction process.

In an alternative embodiment, the separation lug, rather than being an annular ring around the perimeter of the attaching lug, is generally formed in the center of the attaching lug. The individual lamina forming process is the same as that involved in the annular ring method except that the displaced metal forms a stand-off or protrusion at the center of the attaching lug. The separation lug can either be formed in the bottom (FIG. 2) or on the top (FIG. 3) of the attaching lug. In the embodiment shown in FIG. 2A, the die cavity has a recess or counterbore that forms the separation lug 37' on the bottom of the attaching lug 16'. The separation lug 37' of a succeeding lamination 19' when placed on top of the preceding lamination 22' as shown in FIG. 2B, provides the necessary spacing (S') between the laminas.

In the embodiment shown in FIG. 3A, the cavity for forming the separation lug is formed in the face of the punch such that the separation lug 37" is formed on the top of the attaching lug (or from the bottom of the attaching cavity) 16" and projects upward into the attaching cavity 28" to provide the spacing (S") between laminas. When the succeeding lamination 19" is placed on the top of the preceding lamination 22" in stack 25" as shown in FIG. 3B, the separation lug of the preceding lamina projects into the attaching cavity, and contacts the bottom surface of the attaching lug 16" of the succeeding lamination to provide the necessary spacing. In either case, the separation lug, when the individual laminations are stacked, provides the necessary separation between laminas for the annealing process, while the mating of respective attaching lugs and attaching cavities attaches the laminas together during the manufacturing process.

After the individual laminas have been formed and placed within the spaced stack, the next step in forming the laminated part with either of the embodiments previously discussed is then performed. In this case, the spaced stack, being held together by the attaching lugs contacting and being inserted into the attaching cavities of the individual laminas, is then subjected to the annealing process. The separation between the individual laminas provided by the separation lugs allows for the reducing atmosphere in the annealing process to contact all surfaces of the individual laminas. After the annealing process has taken place, the stack of laminations is then pressed axially together in a press, in a manner well known in the art, such that the separation lugs 37 are removed by flattening. That is, the protrusions or stand-offs get compressed such that the final laminated part is formed so that there is no separation space between the individual laminas, giving the laminated part its desired mechanical and electrical characteristics.

Therefore, the present invention provides a method which forms a staking lug 10 comprised of an attaching lug 16 and attaching cavity 28 that attaches a succeeding lamination 19 to the preceding lamina 22 thereby forming a spaced stack 25, providing spacing (S) between the laminas without requiring either positional displacement in alternate laminations or rotation of the stack. The staking lug 37 is formed by coining and displacing metal to two places: one level forming the attaching lug and the other forming the separation lug or stand-off that provides the spacing. Moreover, the diameter of the coined staking lug can be increased or decreased to provide more or less interference fit between the individual laminas. This provides a level of control of the strength of the attachment between the individual laminas as the laminated part is being manufactured. In either of the various embodiments, each lamina is identically formed, obviating the need for alternate stamping or rotation of the individual laminations during stack formation, greatly simplifying the manufacturing process and associated machinery and process controllers.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative only and not limiting as to the scope of the invention which is to be given the full breadth of the appended claims and in any and all equivalents thereof.

We claim:

1. A method of manufacturing a laminated part from a plurality of laminas, wherein the laminas for forming the laminated part are blanked from strip stock material and are then stacked to form the laminated part, the method comprising the steps of:

providing a first lamination having opposed surfaces;

forming a first staking lug on a first one of said opposed surfaces of said first lamination, said first staking lug comprising a first attaching lug and a first separation lug, wherein a first attaching cavity is formed on a first opposite surface;

providing a second lamination having opposed surfaces;

forming a second staking lug on a second one of said opposed surfaces of said second lamination, said second staking lug comprising a second attaching lug and a second separation lug, wherein a second attaching cavity is formed on a second opposite surface; and stacking said first and second laminations, wherein the second staking lug is received in said first attaching cavity such that one of said first and second separation lugs provides a space between said first and second laminations.

2. The method of manufacturing a laminated part as set forth in claim 1, wherein said first separation lug is formed on a face of said first lamination opposite from said first attaching cavity.

3. The method of manufacturing a laminated part as set forth in claim 1, wherein said first separation lug is formed to project from the bottom of said first attaching cavity into said first attaching cavity.

4. The method of manufacturing a laminated part as set forth in claim 2, wherein said first staking lug includes a first top surface and first bottom surface and said first separation lug is formed on the first bottom surface, said second staking lug includes a second top surface, and second bottom surface and said second separation lug is formed on the second bottom surface and the step of stacking said first and second laminations comprises inserting the second staking lug into the first attaching cavity such that the second separation lug contacts the first top surface of the first staking lug so as to provide a space between said first and second laminations.

5. The method of manufacturing a laminated part as set forth in claim 3, wherein said first staking lug includes a first top surface and first bottom surface and said first separation lug is formed on the first top surface, said second staking lug includes a second top surface and second bottom surface and said second separation lug is formed on the second top surface, and the step of stacking said first and second laminations comprises inserting the second staking lug into the first attaching cavity such that the first separation lug contacts the second bottom surface of the second staking lug so as to provide a space between said first and second laminations.

6. The method of manufacturing a laminated part as recited in claim 2, wherein said first lamination comprises a first top surface and first bottom surface and second lamination comprises a second top surface and a second bottom surface, wherein said first separation lug is formed on said first bottom surface so as to be disposed laterally outward from said first attaching lug and said second separation lug is formed on said second bottom surface so as to be disposed laterally outward from said second attaching lug.

7. The method of manufacturing a laminated part as recited in claim 6, wherein each of said first and second separation lugs are annularly disposed about said first and second attaching lugs, respectively.

8. The method of manufacturing a laminated part as set forth in claim 1, further comprising the steps of stacking a plurality of individual laminas to form a lamina stack, and annealing said lamina stack.

9. The method of manufacturing a laminated part as set forth in claim 8, further comprising the step of compressing the lamina stack, wherein said separation lugs are compressed such that substantially no space is provided between each of said plurality of laminas.

10. A method of manufacturing a laminated part from a plurality of laminas, wherein the laminas for forming a laminated part are blanked from strip stock material to have a top and bottom surface and are then stacked to form the laminated part, the method comprising the steps of:

forming staking lugs on said laminas, said staking lugs comprising an attaching lug on the bottom surface and a corresponding attaching cavity on the top surface of said laminas;

forming separation lugs on said laminas so as to project from the bottom surface so as to be annularly disposed about the attaching lug; and assembling said laminas into a laminated part with a space between said individual laminas by inserting an attaching lug of a succeeding lamina into an attaching cavity of a preceding lamina, wherein the separation lug of one of said laminas provides the space between said individual laminas.

11. The method of manufacturing a laminated part as set forth in claim 10, wherein each of said staking lugs includes a top surface and bottom surface and said separation lug is formed on the top surface, and the step of stacking said laminas comprises inserting the staking lug of the succeeding lamina into the attaching cavity of the preceding lamina such that the separation lug of the preceding lamina contacts the bottom surface of the succeeding staking lug so as to provide a space between said laminas.

12. The method of manufacturing a laminated part as recited in claim 10, wherein said laminas comprise a top surface and a bottom surface, wherein said separation lug is formed on the first bottom surface so as to be disposed laterally outward from the attaching lug.

13. The method of manufacturing a laminated part as recited in claim 12, wherein each of said separation lug is annularly disposed about the attaching lug.

14. The method of manufacturing a laminated part as set forth in claim 10, wherein the steps of forming said stacking lugs and said separation lugs are performed concurrently.

15. The method of manufacturing a laminated part as set forth in claim 10, further comprising the steps of stacking a plurality of individual laminas to form a lamina stack, and annealing said lamina stack.

16. The method of manufacturing a laminated part as set forth in claim 10, further comprising the step of compressing the lamina stack, wherein said separation lugs are compressed such that substantially no space is provided between each of said plurality of laminas.

17. The method of making a laminated part as set forth in claim 10, wherein a first volume of the attaching cavity is substantially equal to a second volume comprising the separation lug and the attaching lug.

18. The method of forming a laminated part as set forth in claim 10, wherein the step of forming the stacking lugs further comprises forming the attaching lug and the attaching cavity so as to provide an interference fit between the attaching lug of a succeeding lamina and the attaching cavity of a preceding lamina.

19. A method of manufacturing a laminated part from a plurality of laminas, wherein a plurality of individual laminas for forming a laminated part are blanked from strip stock material and stacked to form the laminated part, the method comprising the steps of:

forming a staking lug on each of said individual laminas, the staking lug comprising an attaching lug on the bottom surface, an attaching cavity on the top surface, and a separation lug;

stacking said plurality of individual laminas by continually placing a succeeding lamina on top of a preceding lamina to form a lamina stack by inserting the attaching lug of said succeeding laminas into the attaching cavity of said preceding laminas, wherein the separation lug of one of said succeeding or preceding lamina provides a space between said succeeding and preceding laminas;

annealing the lamina stack; and compressing the lamina stack to form the laminated part.

20. The method of manufacturing a laminated part from a plurality of laminas as set forth in claim 19, wherein the separation lug is formed on the bottom surface and projects therefrom.

21. The method of manufacturing a laminated part from a plurality of laminas as set forth in claim 20, wherein the separation lug is formed as an annular area around the periphery of the attaching lug, such that the separation lug of the succeeding lamina abuts the top surface of the preceding lamina to provide the space.

22. The method of manufacturing a laminated part from a plurality of laminas as set forth in claim 20, wherein the separation lug is formed on a lower surface of the attaching lug such that the separation lug of the succeeding lamina is inserted into the attaching cavity of the preceding lamina and contacts an upper surface of the attaching lug of said preceding lamina to provide the space.

23. The method of manufacturing a laminated part from a plurality of laminas as set forth in claim 19, wherein the separation lug is formed on an upper surface of the attaching lug so as to project into the attaching cavity, and wherein the step of stacking said plurality of individual laminas comprises inserting the attaching lug of succeeding laminas into the attaching cavity of the preceding lamina whereby the separation lug on the preceding lamina contacts a bottom surface of the attaching lug of the succeeding lamina to provide the space.

24. The method of manufacturing a laminated part from a plurality of laminas as set forth in claim 19, wherein the step of compressing the lamina stack comprises flattening each of said separation lugs so as to substantially remove the space between each of said individual laminas.

25. The method of manufacturing a laminated part from a plurality of laminas as set forth in claim 19, wherein the step of forming the stacking lugs further comprises forming the attaching lug and the attaching cavity so as to provide an interference fit between the attaching lug of a succeeding lamina and the attaching cavity of a preceding lamina.

26. A method of manufacturing a laminated part from a plurality of laminas, wherein the laminas for forming a laminated part are blanked from strip stock material and are then stacked to form the laminated part, the method comprising the steps of:

forming staking lugs on said laminas, said staking lugs comprising an attaching lug on one surface and a corresponding attaching cavity on an opposite surface of said laminas;

forming separation lugs on said laminas so as to project from the attaching lug; and assembling said laminas into a laminated part with a space between said individual laminas by inserting an attaching lug of a succeeding lamina into an attaching cavity of a preceding lamina, wherein the separation lug of said succeeding lamina projects into the attaching cavity of the preceding lamina to provide the space between said individual laminas.

27. The method of manufacturing a laminated part as set forth in claim 26, wherein the steps of forming said stacking lugs and said separation lugs are performed concurrently.

28. The method of manufacturing a laminated part as set forth in claim 26, further comprising the steps of stacking a plurality of individual laminas to form a lamina stack, and annealing said lamina stack.

29. The method of manufacturing a laminated part as set forth in claim 26, further comprising the step of compressing the lamina stack, wherein said separation lugs are compressed such that substantially no space is provided between each of said plurality of laminas.

30. The method of making a laminated part as set forth in claim 26, wherein a first volume of the attaching cavity is substantially equal to a second volume comprising the separation lug and the attaching lug.

31. The method of forming a laminated part as set forth in claim 26, wherein the step of forming the stacking lugs further comprises forming the attaching lug and the attaching cavity so as to provide an interference fit between the attaching lug of a succeeding lamina and the attaching cavity of a preceding lamina.

32. A method of manufacturing a laminated part from a plurality of laminas, wherein the laminas for forming a laminated part are blanked from strip stock material and are then stacked to form the laminated part, the method comprising the steps of:

forming staking lugs on said laminas, said staking lugs having a top surface and a bottom surface and comprising an attaching lug on the bottom surface and a corresponding attaching cavity on the top surface;

forming separation lugs on the bottom surface of said staking lugs so as to project therefrom adjacent the attaching lug; and assembling said laminas into a laminated part with a space between said individual laminas by inserting the staking lug of a succeeding lamina into an attaching cavity of a preceding lamina, wherein the separation lug of the succeeding lamina contacts the top surface of the preceding staking lug so as to provide a space between said individual laminas.

33. The method of manufacturing a laminated part as set forth in claim 32, wherein the steps of forming said stacking lugs and said separation lugs are performed concurrently.

34. The method of manufacturing a laminated part as set forth in claim 32, further comprising the steps of stacking a plurality of individual laminas to form a lamina stack, and annealing said lamina stack.

35. The method of manufacturing a laminated part as set forth in claim 32, further comprising the step of compressing the lamina stack, wherein said separation lugs are compressed such that substantially no space is provided between each of said plurality of laminas.

36. The method of making a laminated part as set forth in claim 32, wherein a first volume of the attaching cavity is substantially equal to a second volume comprising the separation lug and the attaching lug.

37. The method of forming a laminated part as set forth in claim 32, wherein the step of forming the stacking lugs further comprises forming the attaching lug and the attaching cavity so as to provide an interference fit between the attaching lug of a succeeding lamina and the attaching cavity of a preceding lamina.

* * * * *